May 20, 1952 R. T. SPEDDING 2,597,395
POWER-FED, TIMBER-MOWING TRACTOR MOUNTED SAW
Filed April 26, 1950
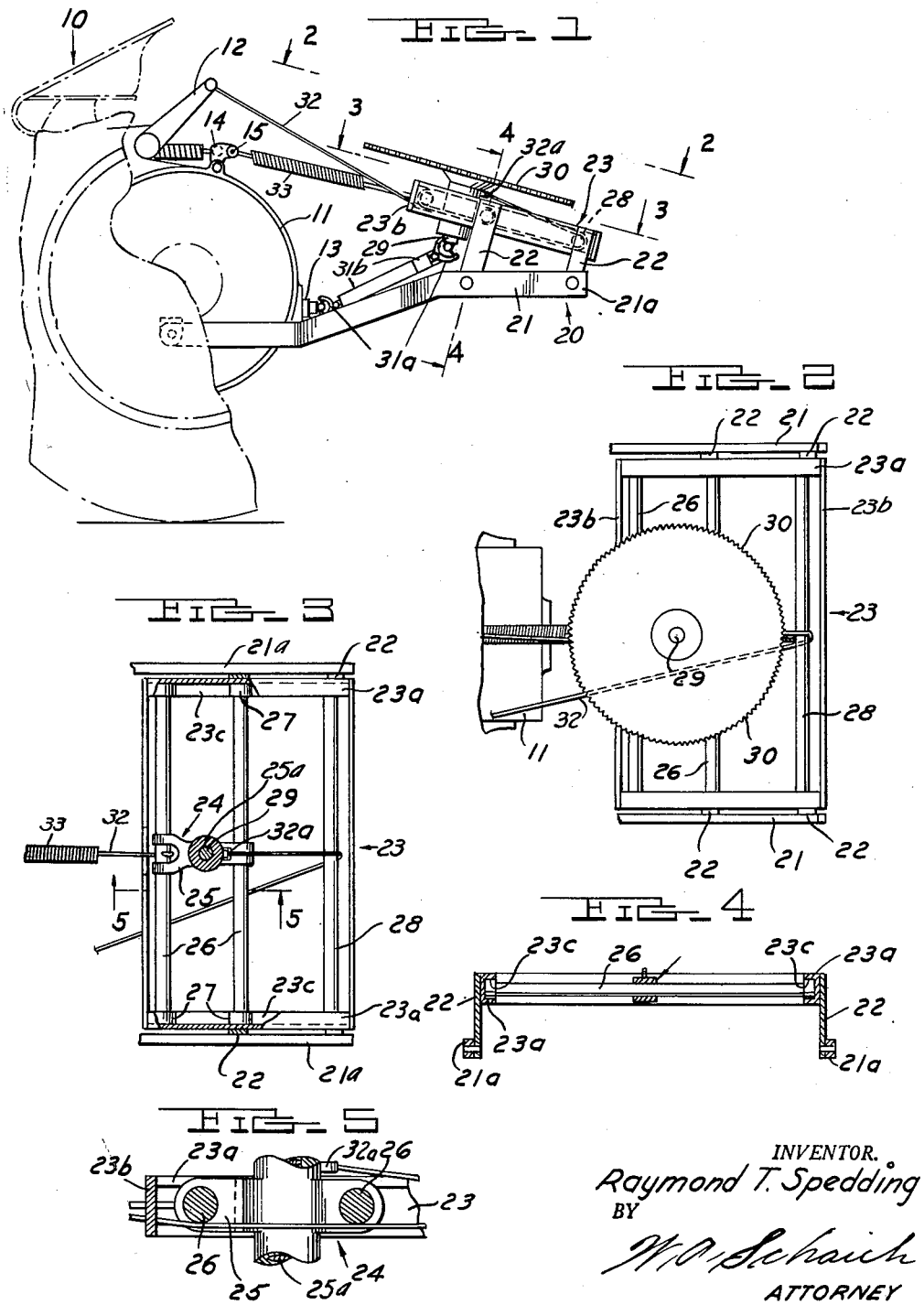
INVENTOR.
Raymond T. Spedding
BY
W. O. Schaich
ATTORNEY Patented May 20, 1952

2,597,395

UNITED STATES PATENT OFFICE 2,597,395

POWER-FED, TIMBER-MOWING TRACTOR MOUNTED SAW

Raymond T. Spedding, Detroit, Mich., assignor to Dearborn Motors Corporation, Highland Park, Mich., a corporation of Delaware Application April 26, 1950, Serial No. 158,260

2 Claims. (Cl. 143—43)

This invention relates to a tractor mounted saw, and particularly a saw for use with tractors having power lifted hitch links.

Heretofore, a variety of constructions have been proposed for mounting cordwood, brush-clearing or tree-felling saws on agricultural type tractors for operation of the rotary saw blade from the tractor power-take-off shaft. However, the prior constructions generally relied upon manual effort to produce the necessary relative movement between the saw and the work to effect the advancement of the saw into the work.

Accordingly, it is an object of this invention to provide an improved tractor mounted saw.

A particular object of this invention is to provide a saw for use with tractors of the type having power-lifted hitch links characterized by the employment of the power actuated arm of such linkage to produce the feeding movement of the saw blade relative to the work.

The specific nature of this invention as well as other objects and advantages thereof, will become apparent to those skilled in the art from the following detailed description, taken in conjunction with the attached sheets of drawings, on which, by way of preferred example only, is illustrated one embodiment of this invention.

On the drawings:

Fig. 1 is a side elevational view of the rear end of the tractor, with parts broken away for clarity, showing a saw constructed in accordance with this invention assembled thereto.

Fig. 2 is a sectional view taken on the plane 2—2 of Fig. 1.

Fig. 3 is a sectional view taken on the plane 3—3 of Fig. 1 with parts broken away for clarity.

Fig. 4 is a partial sectional view taken on the plane 4—4 of Fig. 1.

Fig. 5 is an enlarged detail sectional view taken on the plane 5—5 of Fig. 3.

As shown on the drawings:

The saw construction embodying this invention is preferably employed on a well known type of tractor having a power-lifted hitch linkage. The tractor 10 thus has a rear axle casing 11 on the top of which is pivotally mounted a pair of transversely spaced actuating arms 12 which are pivoted in a counterclockwise direction as viewed in Fig. 1 by a single acting hydraulic mechanism (not shown) contained within the body of the tractor. Such type of tractor also has a rearwardly projecting power-take-off shaft 13 located at the lower central point of the rear axle housing 11, and a top link hitch bracket 14 mounted on the top central portions of the rear axle housing and supporting a pivot pin 15.

The saw construction embodying this invention comprises a frame structure 20 which may be conveniently formed by a pair of longitudinally extending, transversely spaced frame elements 21 which have their forward ends rigidly secured in any suitable manner to spaced portions of the rear axle housing 11. The rear end portions of the frame elements 21 are offset both laterally outwardly and vertically upwardly and terminate in generally horizontally disposed, parallel portions 21a. A plurality of upstanding supporting struts 22 are riveted or otherwise rigidly secured to frame portions 21a and the top ends of such struts support a track frame 23. Track frame 23 is of generally rectangular configuration and comprises a pair of transversely spaced, longitudinally extending channel members 23a which have their end portions rigidly connected by lateral braces 23b. The flanges of the channels project inwardly and hence define a pair of opposed tracks 23c, best shown in Fig. 4. A carriage 24 is provided formed of a central bearing casting 25 and a pair of longitudinally spaced rods 26 having their central portions suitably secured in bearing casting 25 and the outer end portions mounting rollers 27 which are engaged in the respective tracks 23c. Hence the carriage 24 is lineally shiftable in a longitudinal direction relative to the track frame 23, and hence relative to the tractor 10.

At the rear end of the track frame 23 an additional transverse rod 28 is fixedly mounted to function as a sheave for the actuating cable as will be later described.

Bearing casting 25 defines a bearing bore 25a suitable for journalling a saw shaft 29. A rotary saw blade 30 is then conventionally mounted to the top end of shaft 29. The saw blade 30 is rotated through an extensible drive connection to the power-take-off shaft 13 of the tractor which drive connection may constitute a flexible shaft, or as illustrated, a pair of universal joints 31a interconnected by telescoping shaft portions 31b. In this manner, the saw blade 30 will be driven by the tractor in any selected position of the saw carriage with respect to the track frame 23.

A connection is then provided between the carriage 24 and the power actuated arm 12 on the tractor so as to control the advancing of the saw blade 30 into the work by the power actuated arm 12. Since such power actuated arm 12 is generally only power-lifted in the counterclockwise direction, a cable 32 may be conveniently employed as the connection between such arm and the saw carriage 24. Cable 32 has its one end suitably connected to the arm 12 and its other end trained around the other rod 28 and then connected to the carriage 24 as indicated at 32a. In this manner, the forward pivoting of the arm 12 on the tractor will produce a rearward shifting of the saw carriage 24 with respect to the tractor, thus the saw blade 30 may be advanced into the work, for example, when felling a tree, without effort on the part of the operator. To assure the return of the saw carriage 24 to its normal, non-working position illustrated in Fig. 1, a tension spring 33 may be conveniently connected between the forward rod 26 of the carriage 24 and the pin 15 mounted in the lugs 14 on the top central portions of the tractor axle housing 11.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a single acting hydraulic ram, a pivoted arm actuated by said ram and a power-take-off shaft, a saw comprising a frame adapted for securement to the rear end of the tractor, a saw supporting carriage, means mounting said carriage on said frame for linear movement relative thereto in work engaging and work disengaging directions, a saw blade journaled on said carriage and linearly movable therewith, extensible means for driving said saw blade from the tractor power-take-off shaft, a cable connecting said carriage and said pivoted arm, means on said frame and fixed against linear movement guiding the intermediate portions of said cable, whereby the power stroke of the tractor hydraulic ram produces movement of said carriage in the work engaging direction, and resilient blade-return means opposing power movement of said carriage and energized during the power stroke of said ram urging said carriage in the work disengaging direction.

2. For use with a tractor having a single acting hydraulic ram, a pivoted arm actuated by said ram for power movement upwardly and forwardly relative to said tractor and a power-take-off shaft; a saw comprising a frame adapted for securement to the rear end of the tractor, a saw supporting carriage, means mounting said carriage on said frame for linear movement relative thereto longitudinally of said tractor in work engaging and work disengaging directions, a saw blade journaled on said carriage and linearly movable therewith, extensible means for driving said saw blade from the tractor power-take-off shaft, a cable connecting said carriage and said pivoted arm, means rearwardly of said carriage on said frame and fixed against linear movement guiding the intermediate portions of said cable and reversing the direction of movement of a portion of said cable relative to said tractor, whereby the power stroke of the tractor hydraulic ram causing forward movement of said pivoted arm produces rearward movement of said carriage in the work engaging direction, and resilient blade-return means opposing power movement of said carriage and energized during the power stroke of said ram urging said carriage in the work disengaging direction.

RAYMOND T. SPEDDING.

REFERENCES CITED

The following references are of record in the file of this patent:

UNITED STATES PATENTS

| Number | Name | Date |
| --- | --- | --- |
| 892,895 | Rose | July 7, 1908 |
| 1,414,319 | Zaiauskis | Apr. 25, 1922 |
| 1,447,543 | Gessman | Mar. 6, 1923 |
| 1,645,924 | Palmigiano | Oct. 18, 1927 |
| 2,354,625 | Van Sickle | July 25, 1944 |
| 2,426,694 | King | Sept. 2, 1947 |
| 2,436,504 | Duncklee | Feb. 24, 1948 |
| 2,439,607 | Irwin | Apr. 13, 1948 |